US007725894B2

(12) United States Patent
Check et al.

(10) Patent No.: US 7,725,894 B2
(45) Date of Patent: May 25, 2010

(54) ENHANCED UN-PRIVILEGED COMPUTER INSTRUCTION TO STORE A FACILITY LIST

(75) Inventors: Mark A. Check, Hopewell Junction, NY (US); John R. Ehrman, Sunnyvale, CA (US); Mark S. Farrell, Pleasant Valley, NY (US); Mike S. Fulton, Maple Ridge (CA); Charles W. Gainey, Poughkeepsie, NY (US); Dan F. Greiner, San Jose, CA (US); Damian L. Osisek, Vestal, NY (US); Peter J. Relson, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 11/532,177

(22) Filed: Sep. 15, 2006

(65) Prior Publication Data

US 2008/0072224 A1 Mar. 20, 2008

(51) Int. Cl.
*G06F 9/455* (2006.01)
(52) U.S. Cl. ........................................................ 718/1
(58) Field of Classification Search ...................... 718/1
See application file for complete search history.

(56) References Cited

U.S. PATENT DOCUMENTS

2006/0020663 A1* 1/2006 Matsunami et al. ......... 709/203

2008/0072224 A1  3/2008  Check et al.

OTHER PUBLICATIONS

Pentium Processor Family Developers Manual, vol. 3: Architecture and Programming Manual, Intel Corporation, pp. 4-46 to 4-47, 5-1 to 5-13 and 25-73 to 25-74.*
"z/Architecture Principles of Operations", IBM Publication No. SA22-7832-04, publish date Sep. 19, 2005, 1144 pages (per the Examiner's request, full copies enclosed).
"z/Architecture Principles of Operations", IBM Publication No. SA22-7832-03, publish date May 2004, 1150 pages (per the Examiner's request, full copies enclosed).
"z/Architecture Principles of Operation" IBM publication No. SA22-7831-04, pp. 7-216, 7-217, 10-112, & 10-113.

* cited by examiner

*Primary Examiner*—Richard Ellis
(74) *Attorney, Agent, or Firm*—John E. Campbell

(57) ABSTRACT

A method is provided for recording a list of facilities available to a program executing on an information processing system. In such method a storage location and a length of data are defined for recording the list of facilities by a program being executed on the information processing system. An instruction is issued by the program for determining the available facilities and recording the list of available facilities in accordance with the defined storage location and data length. A processor executes the instruction to determine the available facilities and record the list of facilities in accordance with the defined storage location and defined data length. The recorded list of facilities can then be read by the first program.

20 Claims, 3 Drawing Sheets

ENHANCED UN-PRIVILEGED COMPUTER INSTRUCTION TO STORE A FACILITY LIST

BACKGROUND OF THE INVENTION

The present invention relates to an information processing system, e.g., a programmable digital computer, as well as an information processing method and a computer-readable recording medium having recorded thereon a program for performing such method.

Information processing systems include not only general purpose computers which can be programmed to perform tasks of virtually unlimited variety, but also more specialized equipment which typically is employed to perform certain specialized tasks such as information storage and retrieval, media recording and reproduction, etc.

Information processing systems, both general purpose and special purpose systems, typically are enabled to perform specialized tasks by programs. Application programs include those which are adapted especially for a particular end use of an information processing system. Application programs tend to use the resources of an information processing system in ways that can vary greatly from one application program to another. Sometimes, an application program utilizes particular facilities of an information processing system that are infrequently used by other application programs. By way of example, particular facilities used by an application program can include the ability to execute certain instructions that address the needs of the particular application program.

Since particular facilities used by one application program may be infrequently used by other application programs, the facilities need not be included in or be available as part of every information processing system on which other application programs are executed. In some cases, a particular facility is only available when the information processing system is an upgraded version in relation to another less equipped version of the information processing system, e.g., a base model. Alternatively, the particular facility may only be present when the information processing system is specifically configured to incorporate such facility.

Since the facilities available on any given information processing system can vary, it is useful for programs which are executed thereon to be able to determine quickly which facilities of the information processing system are available. Programs can then be executed in a way that takes advantage of the available facilities.

In a prior art information processing system according to the z/Architecture Principles of Operation (Publication Number SA22-7832-04, available from IBM Corporation, Armonk, N.Y., which is incorporated herein by reference in its entirety), an instruction known as STORE FACILITY LIST ("STFL") returns a result which indicates whether or not certain facilities are available and installed on the information processing system. The results are returned in form of a fixed length and fixed definition data record in which each bit thereof identifies whether or not a particular facility is installed. The STFL instruction is also limited in how it can be issued and how the result can be accessed.

One limitation is that STFL is a control instruction. The STFL instruction can only be issued by a program that is being executed in the "supervisor state". Such program is referred to as a system-control program, or operating system. The STFL instruction cannot be executed by an application program, i.e., a program that is currently being executed in the "problem state," as opposed to the supervisor state. If the STFL instruction is issued by an application program, a privileged-operation program exception condition is recognized, which prevents the instruction from being executed.

In an embodiment, a computer system includes a Program Status Word. The current program-status word (PSW) in the CPU contains information required for the execution of the currently active program. The PSW is 128 bits in length and includes the instruction address, condition code, and other control fields. In general, the PSW is used to control instruction sequencing and to hold and indicate much of the status of the CPU in relation to the program currently being executed. Additional control and status information is contained in control registers and permanently assigned storage locations.

The status of the CPU can be changed by loading a new PSW or part of a PSW. Control is switched during an interruption of the CPU by storing the current PSW, so as to preserve the status of the CPU, and then loading a new PSW.

The current program-status word (PSW) in the CPU contains information required for the execution of the currently active program. The PSW is 128 bits in length and includes the instruction address, condition code, and other control fields. In general, the PSW is used to control instruction sequencing and to hold and indicate much of the status of the CPU in relation to the program currently being executed. Additional control and status information is contained in control registers and permanently assigned storage locations. The status of the CPU can be changed by loading a new PSW or part of a PSW. Control is switched during an interruption of the CPU by storing the current PSW, so as to preserve the status of the CPU, and then loading a new PSW.

Problem State (P): When p bit of the PSW (bit 15) is one, the CPU is in the problem state. When bit 15 is zero, the CPU is in the supervisor state. In the supervisor state, all instructions are valid. In the problem state, only those instructions are valid that provide meaningful information to the problem program and that cannot affect system integrity; such instructions are called unprivileged instructions. The instructions that are never valid in the problem state are called privileged instructions. When a CPU in the problem state attempts to execute a privileged instruction, a privileged-operation exception is recognized. Another group of instructions, called semi-privileged instructions, are executed by a CPU in the problem state only if specific authority tests are met; otherwise, a privileged-operation exception or a special-operation exception is recognized.

Another limitation relates to the location at which the results returned by the STFL instruction are stored. In accordance with prior art z/Architecture, results returned by the STFL instruction are always mapped to the same real address of 200 (C8 hexadecimal) in memory. Using the z/OS operating system, this real address is mapped to a real page-frame address of zero in the address space of each application program. In this way, each application program on a system which uses the ZOS operating system can directly access the result returned by a STFL instruction issued by the operating system. However, when a different operating system is provided such as Linux, real address 200 is not mapped to a location within the address space of an application program. In that case, an application program cannot view the facilities information returned by the STFL instruction without the support of the operating system (for example, the operating system may provide a system call which will return this information to the application program).

Other limitations of the STFL instruction are the short, fixed length of 32 bits of the result it returns and the fixed definition given to each of the 32 bits included in the result. In certain cases, a particular application program needs to obtain information about the capabilities of the information processing system which does not fit within the traditional bit definitions of the result of the STFL instruction. The number of bits returned by executing the STFL instruction and the definition given to each bit can fall short of the information needed by a particular application program.

SUMMARY OF THE INVENTION

A method, recording medium, and system are provided for recording a list of facilities available to a program executing on an information processing system. In such method, a storage location and a length of data are defined for recording the list of facilities by a program being executed on the information processing system. An instruction is issued by the program for determining the available facilities and recording the list of available facilities in accordance with the defined storage location and data length. A processor executes the instruction to determine the available facilities and record the list of facilities in accordance with the defined storage location and defined data length. The recorded list of facilities can then be read by the first program.

DETAILED DESCRIPTION

Figure 1:
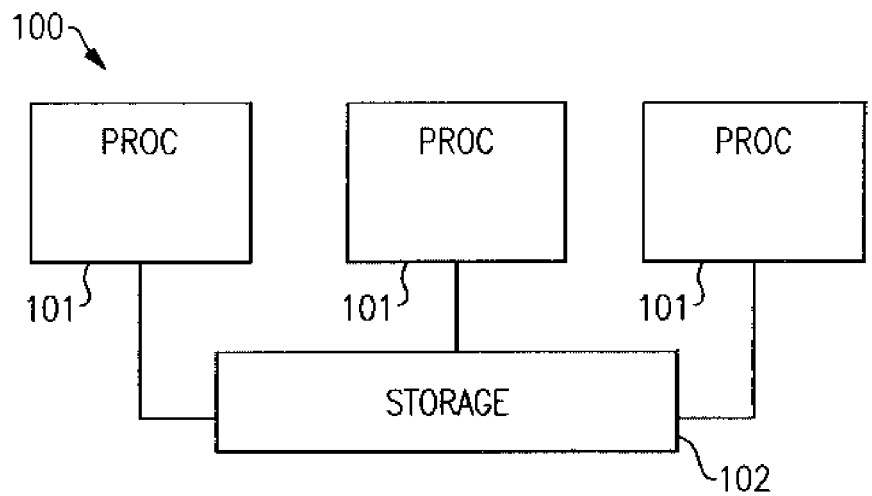
FIG. 1 is a block and schematic diagram illustrating a physical organization of an information processing system in accordance with an embodiment of the invention.

FIG. 1 illustrates a computing environment which supports the performance of a method in accordance with an embodiment of the invention. In the computing environment illustrated in FIG. 1, a multi-processor system 100 includes a plurality of physical processors 101, also referred to as central processing units ("CPUs"), which are linked together via a common storage and interconnect subsystem 102, as shown in FIG. 1. The term physical processor denotes the hardware together with microcode, firmware and lowest level processing software for enabling the physical processor to support the operation of an operating system and processes subject to its control. While the multi-processor system 100 is illustrated with only three physical processors, it is possible for the multi-processor system to have fewer or a greater number of physical processors. The storage subsystem 102 contains certain storage resources which are subject to being shared among the physical processors.

Figure 2:
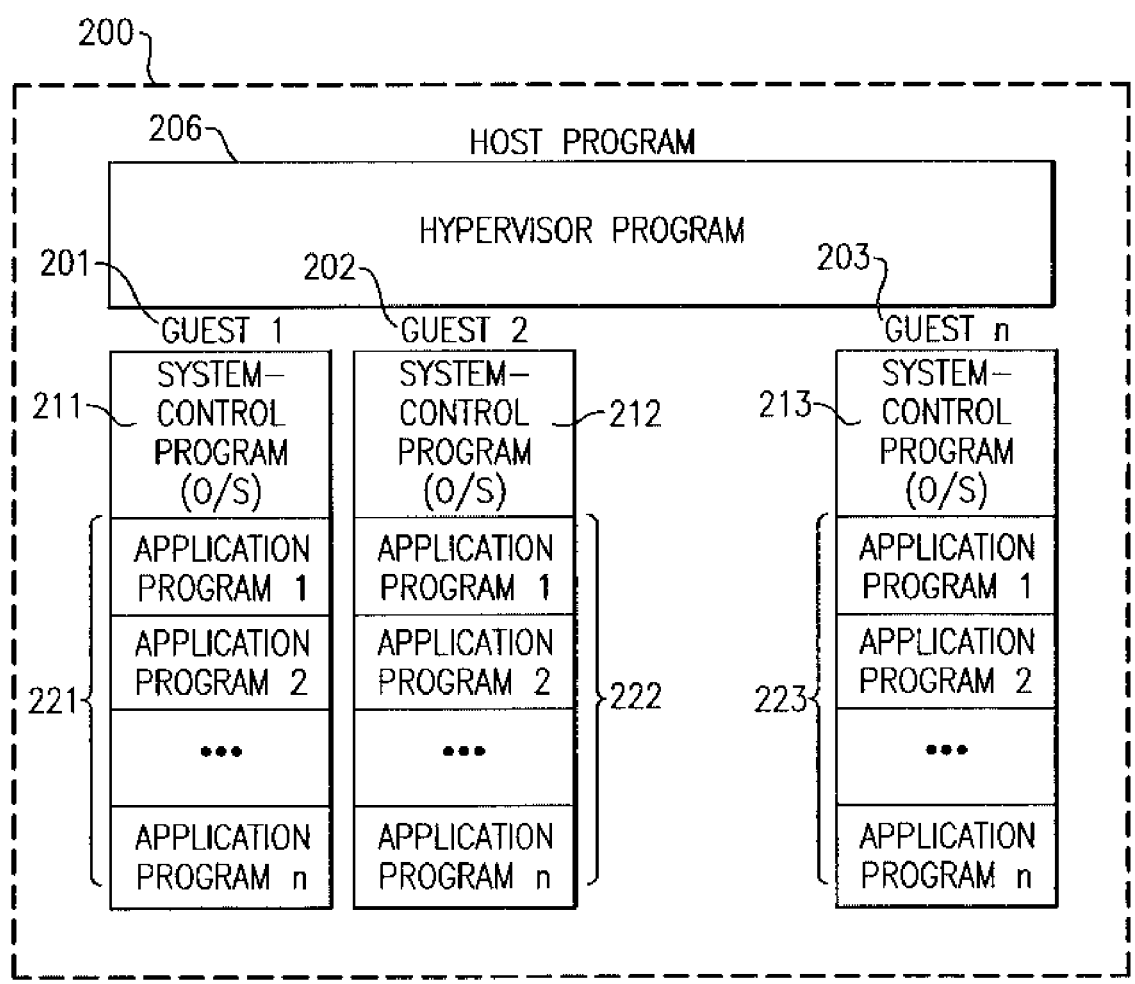
FIG. 2 is a block diagram illustrating a logical organization of an information processing system in accordance with an embodiment of the invention.

FIG. 2 is a diagram illustrating a logical organization of an exemplary information processing system, which can be supported by the physical computing environment as illustrated and described above with reference to FIG. 1. Virtualization technology provides for the apportioning of the resources of a configuration to one or more logical configurations. The apportioning of the resources is under the control of a hypervisor program known as a "host program" (206). The resources, including one or more CPUs in the information processing system, memory, and I/O channels are apportioned to one or more logical configurations (known as guests). One means of such virtualization is for a host program known as the logical-partition (LPAR) manager to apportion the resources into guests called logical partitions (LPARs). These guests may include one or more versions of operating systems such as z/OS, zVM, Linux, etc., and the applications associated with those systems. Another means of such virtualization is for the host program to be Virtual-Machine (VM) operating system which apportions its resources into guests called virtual machines. The virtual machine guests may include operating systems such as z/OS, Linux, and even another instance of the VM operating system.

The virtualization technology may be nested such that the VM operating system may run as a guest under the control of the LPAR hypervisor as the host program. In this case, the VM operating system is said to be operating at guest-level 1, and its guests operate at guest-level 2. FIG. 2 illustrates the apportioning of storage (200) to a host program (206) which can be the LPAR hypervisor or the VM operating system. Under the control of the host program are multiple guests (201, 202, 203, etc.). Each guest includes a system-control program, also known as an operating system (211, 212, 213) which controls the application programs (221, 222, and 223) running within the guest. The operating system (211) running in guest 1 (201) controls the application programs (221) within the guest. Similarly, the operating system (212) in guest 2 (202) controls its application programs (222), and the operating system (213) in guest 3 (203) controls its application programs (223).

As the host program, the hypervisor 206 allocates resources and keeps tracks of resources allocated to individual ones of the guests of the information processing system by entries made in tables and other data structures within host storage. Entries in tables, data structures, etc. in the operating system memory allow the host program to provide access to certain facilities of the information processing system in a way that is selective to particular guests. The term "facilities" refers to particular executable instructions, executable functions, and other particular ways of operating the information processing system. Facilities need not be granted universally to each guest. Since certain facilities can be specially geared to the needs of certain programs, through use of the methods and systems described herein, facilities can be selectively provided to only one or some of the guests, and not to other guests.

Among the limitations of the system described above as background to the invention is the requirement that the result of executing the STORE FACILITY LIST (STFL) instruction be placed at a particular real address in memory. In addition to the execution result being not as easy to access when certain operating systems, e.g., Linux, are used, this requirement of the prior art had the added consequence of limiting the amount and type of information obtained when executing the instruction to certain pro-defined information. These limitations are overcome by the method of recording a list of available facilities using the STORE FACILITY LIST EXTENDED ("STFLE") instruction in accordance with an embodiment of the present invention. Through use of the new STFLE instruction, application programs are given control over the location for storing the execution result of the instruction, and are given more control over the amount of facilities information they can request.

Figure 3:
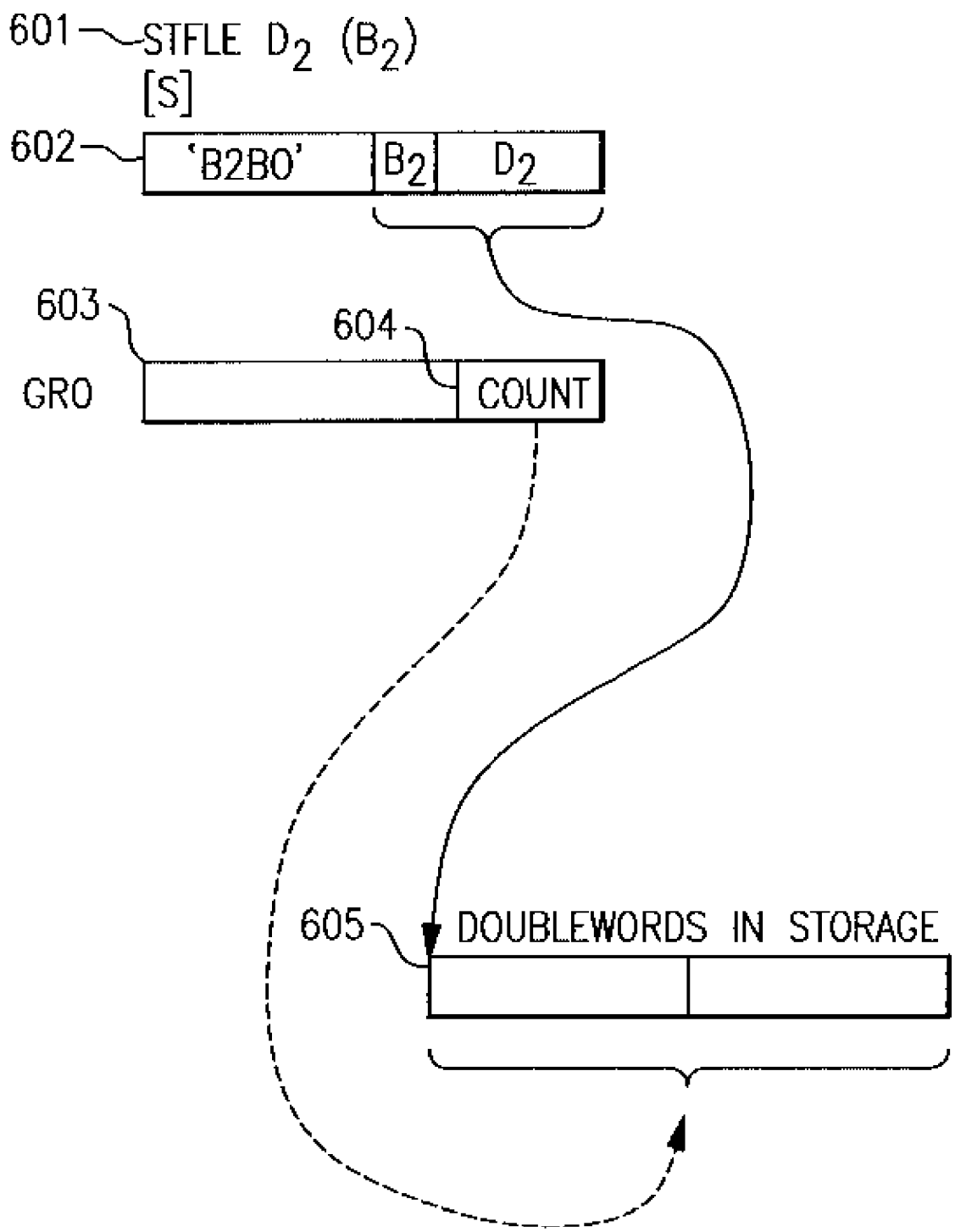
FIG. 3 shows the format of the STFLE instruction, its storage operand, and associated register usage.

FIG. 3 provides an illustration of the STORE FACILITY LIST EXTENDED instruction, showing the mnemonic (STFLE) and symbolic representation of its storage-operand specification, $D_2(B_2)$, as would be coded by an assembly-language program; also shown is the instruction format [S] (601). The "S" instruction format indicates that STFLE has a two-byte operation code (opcode) and an operand that includes a 12-bit displacement field ($D_2$) added to an address contained in a base register ($B_2$). The machine format (602) of the STFLE instruction in memory shows the actual operation code (B2B0 hex) and the in-storage placement of the base register field and displacement field of the instruction. The storage operand of STFLE designates a logical address (that is, the address is virtual or real, depending on whether dynamic-address translation is enabled). When the STFLE instruction is executed, the CPU locates the storage operand based on the address provided by the instruction, and stores the facility indications at that address.

The length of the result field is implicitly specified by a count value contained in the rightmost bits (604) of general register 0 ("GR0", 603). Bits 56-63 of general register 0 contain a value representing one less than the number of doublewords provided in the result field. For example, a value of 2 indicates that the result field can accommodate three doublewords (24 bytes) of data. The eight bit count value allows a result of up to 256 doublewords to be returned when executing the instruction.

If the length field (604) in general register 0 (603) specifies sufficient doublewords to hold the result, the entire facility list is stored and the instruction ends by setting condition code 0. If the length field in general register 0 does not specify sufficient doublewords to hold the entire result, the number of doublewords specified are stored, and the instruction ends by setting condition code 3. In either case, general register 0 is updated to contain one less than the number of doublewords required to contain all of the facility bits that are assigned for the model.

When the STFLE instruction is executed by the highest-level host program (that is, a program for which there is no hypervisor), the instruction operates as described above. When the STFLE instruction is executed by a guest program, the CPU interprets the instruction by using information provided by the host program, as described below.

Figure 4:
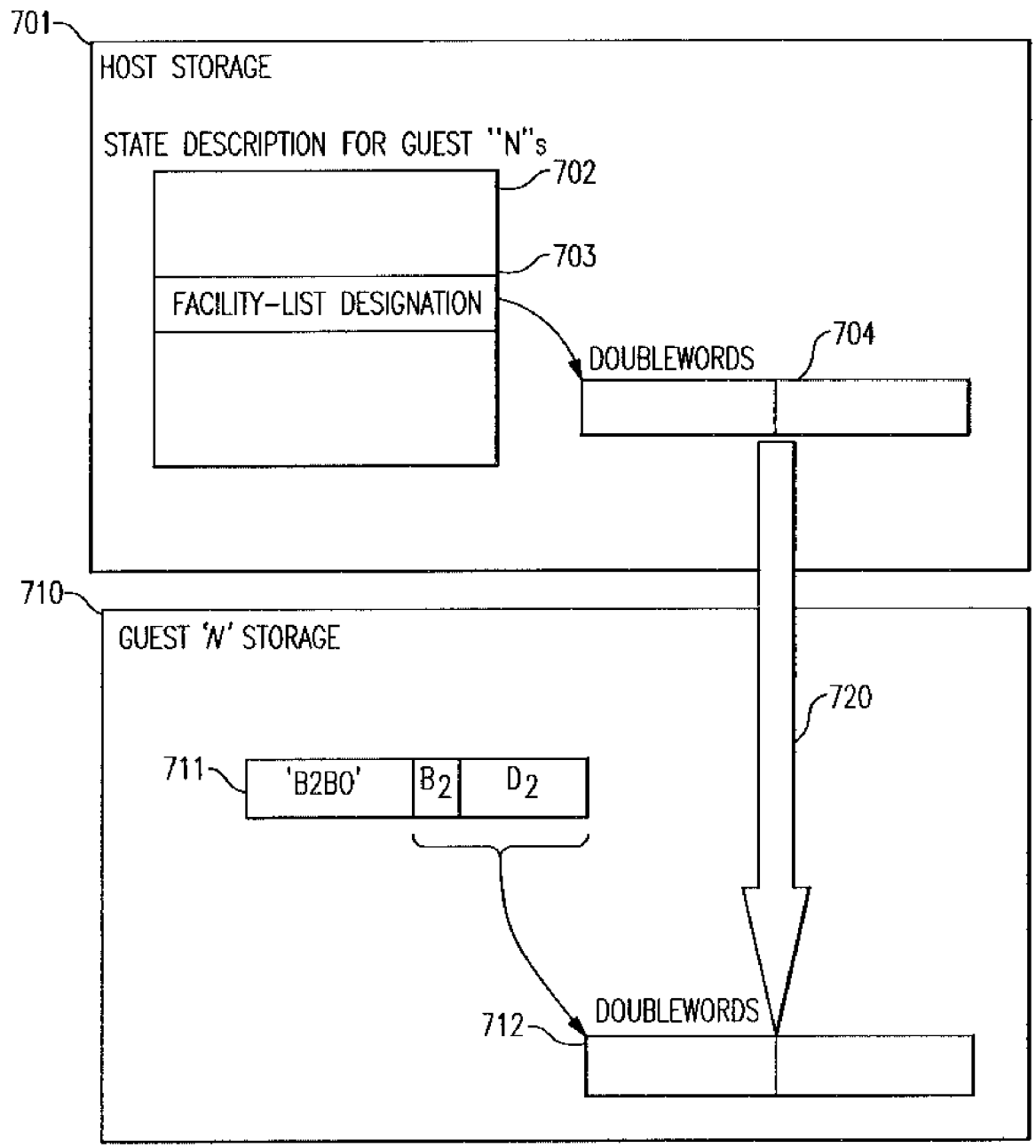
FIG. 4 illustrates a method of recording a list of facilities by a guest program using the STFLE instruction.

FIG. 4 shows the execution of the STFLE instruction in a guest environment. During the initialization of a host program, the STFLE instruction is executed to determine the facilities available to the host configuration. The host program may choose to alter the facility list that is made available to its guests. This can occur when a facility provided by the CPU requires assistance of the host program to operate correctly, and the host program is unable to provide that assistance. This can be the case when a back-level VM system runs on a newer CPU, for example. Another case where the host program may choose to alter the facility list available to a guest is when the guest simulates a facility which is not provided on the CPU.

In order to dispatch a guest configuration, the host program establishes certain guest parameters in a state description (702) in host storage (701) and executes a START INTERPRETIVE EXECUTION instruction. Within the state description is a pointer to a facility-list designation (703) that points to the facility list (704) to be provided to the guest associated with the state description. The host program constructs the facility list to contain facility bits that the host program discovers by its own execution of STFLE, while removing facility bits for any facilities that the host program cannot support. In addition, the host program adds facility bits to the facility list for facilities which are not physically installed in the information processing system, but which, nevertheless, the host program emulates for the guest.

When a guest (a system control program (e.g., 211, FIG. 2) or application program (e.g., Application Program 1 (221), FIG. 2)) issues a STFLE instruction (711), it designates the address of one or more doublewords (712) in guest storage (710) in which the result is to be placed. The CPU's execution of the STFLE instruction for a guest causes the host-specified facility bits for the guest (704) to be copied (720) into the guest's storage location (712). This copying is performed by the CPU without any intervention by the host program. If the guest has not provided sufficient doublewords, then only the number of doublewords specified by the guest is copied, and the condition code indicates an incomplete result.

If the facility-list designation (703) in the state description (702) contains all zeros and the guest executes a STFLE instruction, an instruction interception occurs, and control returns to the host program. If the facility-list designation (703) designates an unavailable storage location, then a validity interception is recognized, and control returns to the host program.

In an embodiment, facilities installed in a configuration are indicated by facility bits stored by the STORE FACILITY LIST (STFL) and STORE FACILITY LIST EXTENDED (STFLE) instructions. STORE FACILITY LIST stores an indication of up to 32 facilities in the word at real location 200. STORE FACILITY LIST EXTENDED stores a variable number of double words containing facility bits in a program-specified location. A bit is set to one regardless of the current architectural mode if its meaning is true. A meaning applies to the current architectural mode unless it is said to apply to a specific architectural mode. Unassigned bits are reserved for indication of new facilities; these bits may be stored as ones in the future. The following list shows the meanings of the assigned facility bits in the embodiment.

Bit   Meaning When Bit Is One

0   The instructions marked "N3" in an instruction summary are installed.
1   The z/Architecture architectural mode is installed.
2   The z/Architecture architectural mode is active. When this bit is zero, the ESA/390 architectural mode is active.
3   The DAT-enhancement facility is installed in the z/Architecture architectural mode. The DAT enhancement facility includes the INVALIDATE DAT TABLE ENTRY (IDTE) and COMPARE AND SWAP AND PURGE (CSPG) instructions.
4   INVALIDATE DAT TABLE ENTRY (IDTE) performs the invalidation-and-clearing operation by selectively clearing combined region-and-segment table entries when a segment-table entry or entries are invalidated. IDTE also performs the clearing-by-ASCE operation. Unless bit 4 is one, IDTE simply purges all TLBs. Bit 3 is one if bit 4 is one.
5   INVALIDATE DAT TABLE ENTRY (IDTE) performs the invalidation-and-clearing operation by selectively clearing combined region-and-segment table entries when a region-table entry or entries are invalidated. Bits 3 and 4 are ones if bit 5 is one.
6   The ASN-and-LX reuse facility is installed in the z/Architecture architectural mode.
7   The store-facility-list-extended facility is installed.
9   The sense-running-status facility is installed in the z/Architecture architectural mode.
16  The extended-translation facility 2 is installed.
17  The message-security assist is installed.
18  The long-displacement facility is installed in the z/Architecture architectural mode.
19  The long-displacement facility has high performance. Bit 18 is one if bit 19 is one.
20  The HFP-multiply-add/subtract facility is installed.
21  The extended-immediate facility is installed in the z/Architecture architectural mode.
22  The extended-translation facility 3 is installed in the z/Architecture architectural mode.
23  The HFP-unnormalized-extension facility is installed in the z/Architecture architectural mode.
24  The ETF2-enhancement facility is installed.
25  The store-clock-fast facility is installed in the z/Architecture architectural mode.
28  The TOD-clock-steering facility is installed in the z/Architecture architectural mode.

-continued

| Bit | Meaning When Bit Is One |
|---|---|
| 30 | The ETF3-enhancement facility is installed in the z/Architecture architectural mode. |

The methods described herein are typically performed by hardware, e.g., a CPU, or by a combination of hardware and one or more programs, e.g., microcode, millicode, firmware, software and the like, executed by the hardware. Such program can be recorded on a recording medium, e.g., storage including electronic, magnetic, optical or other technology. The recording medium can be embodied within the information processing system or may be package for distribution or delivery, via a portable medium such as a disk, or via electronic delivery means, e.g., over a network.

While the invention has been described in accordance with certain preferred embodiments thereof, many modifications and enhancements can be made thereto without departing from the true scope and spirit of the invention, which is limited only by the claims appended below.

What is claimed is:

1. A computer implemented method for executing an un-privileged Store Facility List Extended (STFLE) instruction in a computer system, the STFLE instruction comprising an op-code field, the method comprising:
   executing, by the computer system, the un-privileged STFLE instruction, the execution comprising;
   specifying, by the computer system, a size of a result to be based on a length-of-result value, the size specifying a first number of bits;
   based on facilities available on the computer system, creating a result value, by the computer system, the result value consisting of a second number of facility bit positions, wherein each facility bit position corresponding to an available facility indicates that the corresponding facility is available;
   responsive to the second number of facility bit positions being any one of less-than or equal-to the first number of bits specified by the length-of-result value, setting, by the computer system, a condition code to a first value, the first value indicating the second number of facility bit positions is any one of less-than or equal-to the first number of bits; and
   responsive to the second number of facility bit positions being any one of less-than or equal-to the first number of bits specified by the length-of-result value, storing, by the computer system, the result value in memory at an address specified by the STFLE instruction.

2. The method according to claim 1, further comprising:
   responsive to the second number of facility bit positions being greater-than the first number of bits, setting the condition code to a second value, the second value indicating the second number of facility bit positions is greater than the first number of bits; and
   responsive to the second number of facility bit positions being greater-than the first number of bits storing only facility bit positions of the result value corresponding to the first number of bits of the result value in memory at the address specified by the STFLE instruction.

3. The method according to claim 2, wherein the length-of-result value is obtained from an implicitly defined register, wherein the un-privileged STFLE instruction is obtained for said execution from an application program, wherein the computer is in a problem state, the problem state preventing privileged instructions from executing, wherein privileged instructions are executable in supervisory state.

4. The method according to claim 3, wherein the implicitly defined register is register number 0 of 16 registers, the registers numbered 0 through 15, further comprising:
   a hypervisor routine setting the result value to a hypervisor routine determined value indicating hypervisor allocated facilities.

5. The method according to claim 3, wherein the length-of-result value is a third number that specifies a fourth number of double-words, each double-word consisting of 64 bits, the fourth number of double-words being one more than the third number, the method further comprising:
   saving the third number in the implicitly defined register, the third number being one less than a number of double-words needed to accommodate the first number of bits.

6. The method according to claim 1, wherein the STFLE instruction further comprises a base field specifying a base register and a displacement field, the execution further comprising:
   obtaining a first value from the base register; and
   arithmetically adding the obtained first value to the displacement field value to determine a logical address of the address for storing the bit significant value in memory; and
   translating the determined logical address to form the address for storing the result value in memory.

7. A computer program product for executing an un-privileged Store Facility List Extended (STFLE) instruction in a computer system, the STFLE instruction comprising an op-code field, the computer program product comprising:
   a tangible computer readable storage medium readable by a processing circuit and storing instructions for execution by the processing circuit for performing a method comprising:
   executing the un-privileged STFLE instruction, the execution comprising;
   specifying a size of a result to be saved based on a length-of-result value, the size specifying a first number of bits;
   based on facilities available on the computer system, creating a result value, the result value consisting of a second number of facility bit positions, wherein each facility bit position corresponding to an available facility indicates that the corresponding facility is available;
   responsive to the second number of facility bit positions being any one of less-than or equal-to the first number of bits specified by the length-of-result value, setting a condition code to a first value, the first value indicating the second number of facility bit positions is any one of less-than or equal-to the first number of bits; and
   responsive to the second number of facility bit positions being any one of less-than or equal-to the first number of bits specified by the length-of-result value, storing the result value in memory at an address specified by the STFLE instruction.

8. The computer program product according to claim 7, wherein the method further comprises:
   responsive to the second number of facility bit positions being greater-than the first number of bits, setting the condition code to a second value, the second value indicating the second number of facility bit positions is greater than the first number of bits; and
   responsive to the second number of facility bit positions being greater-than the first number of bits storing only facility bit positions of the result value corresponding to the first number of bits of the result value in memory at the address specified by the STFLE instruction.

9. The computer program product according to claim 7, wherein the length-of-result value is obtained from an implicitly defined register, wherein the un-privileged STFLE instruction is obtained for said execution from an application program, wherein the computer is in a problem state, the problem state preventing privileged instructions from executing, wherein privileged instructions are executable in supervisory state.

10. The computer program product according to claim 9, wherein the implicitly defined register is register number 0 of 16 registers, the registers numbered 0 through 15, wherein the method further comprises:
   a hypervisor routine setting the result value to a hypervisor routine determined value indicating hypervisor determined facilities available.

11. The computer program product according to claim 7, wherein the length-of-result value is a third number that specifies a fourth number of double-words, each double-word consisting of 64 bits, the fourth number of double-words being one more than the third number, the method further comprising:
   saving the third number in the implicitly defined register, the third number being one less than a number of double-words needed to accommodate the first number of bits.

12. The computer program product according to claim 7, wherein the STFLE instruction further comprises a base field specifying a base register and a displacement field, the execution further comprising:
   obtaining a first value from the base register; and
   arithmetically adding the obtained first value to the displacement field value to determine a logical address of the address for storing the bit significant value in memory; and
   translating the determined logical address to form the address for storing the result value in memory.

13. The computer program product according to claim 10, wherein the application program is running in a guest partition configured by the hypervisor, wherein the method further comprises:
   the hypervisor routine issuing a STFLE instruction to determine a hypervisor list of facilities available to the hypervisor;
   the hypervisor routine altering the determined hypervisor list of facilities to create a list of facilities allocated to the guest partition; and
   using the created list of facilities to provide the hypervisor routine determined value.

14. A system for executing an un-privileged Store Facility List Extended (STFLE) instruction in a computer system, the STFLE instruction comprising an op-code field, the system comprising:
   a memory; and
   a processor in communication with the memory, the processor capable of performing a method comprising:
   executing the un-privileged STFLE instruction, the execution comprising;
   specifying a size of a result to be saved based on a length-of-result value, the size specifying a first number of bits;
   based on facilities available on the computer system, creating a result value, the result value consisting of a second number of facility bit positions, wherein each facility bit position corresponding to an available facility indicates that the corresponding facility is available;
   responsive to the second number of facility bit positions being any one of less-than or equal-to the first number of bits specified by the length-of-result value, setting a condition code to a first value, the first value indicating the second number of facility bit positions is any one of less-than or equal-to the first number of bits; and
   responsive to the second number of facility bit positions being any one of less-than or equal-to the first number of bits specified by the length-of-result value, storing the result value in memory at an address specified by the STFLE instruction.

15. The system according to claim 14, wherein the method further comprises:
   responsive to the second number of facility bit positions being greater-than the first number of bits, setting the condition code to a second value, the second value indicating the second number of facility bit positions is greater than the first number of bits; and
   responsive to the second number of facility bit positions being greater-than the first number of bits storing only facility bit positions of the result value corresponding to the first number of bits of the result value in memory at the address specified by the STFLE instruction.

16. The system according to claim 14, wherein the length-of-result value is obtained from an implicitly defined register, wherein the un-privileged STFLE instruction is obtained for said execution from an application program, wherein the computer is in a problem state, the problem state preventing privileged instructions from executing, wherein privileged instructions are executable in supervisory state.

17. The system according to claim 16, wherein the implicitly defined register is register number 0 of 16 registers, the registers numbered 0 through 15, wherein the method further comprises:
   a hypervisor routine setting the result value to a hypervisor routine determined value indicating hypervisor allocated facilities.

18. The system according to claim 14, wherein the length-of-result value is a third number that specifies a fourth number of double-words, each double-word consisting of 64 bits, the fourth number of double-words being one more than the third number, the method further comprising:
   saving the third number in the implicitly defined register, the third number being one less than a number of double-words needed to accommodate the first number of bits.

19. The system according to claim 14, wherein the STFLE instruction further comprises a base field specifying a base register and a displacement field, the execution further comprising:
   obtaining a first value from the base register; and
   arithmetically adding the obtained first value to the displacement field value to determine a logical address of the address for storing the bit significant value in memory; and
   translating the determined logical address to form the address for storing the result value in memory.

20. The system according to claim 17, wherein the application program is running in a guest partition configured by the hypervisor, wherein the method further comprises:
   the hypervisor routine issuing a STFLE instruction to determine a hypervisor list of facilities available to the hypervisor;
   the hypervisor routine altering the determined hypervisor list of facilities to create a list of facilities allocated to the guest partition; and
   using the created list of facilities to provide the hypervisor routine determined value.

* * * * *